United States Patent
Cresswell et al.

(10) Patent No.: US 8,701,444 B2
(45) Date of Patent: Apr. 22, 2014

(54) PLUNGER AND PARISON MOLD ASSEMBLY FOR A NARROW-NECK PRESS-AND-BLOW WINE BOTTLE

(75) Inventors: Phyllis A. Cresswell, Perrysburg, OH (US); Vincent J. Bailey, Perrysburg, OH (US); Edward A. Grant, Northwood, OH (US); Daniel L. Newsom, Oak Harbor, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 83 days.

(21) Appl. No.: 13/530,499

(22) Filed: Jun. 22, 2012

(65) Prior Publication Data

US 2013/0340482 A1 Dec. 26, 2013

(51) Int. Cl.
*C03B 11/06* (2006.01)

(52) U.S. Cl.
USPC .................................. 65/362; 65/305; 65/307

(58) Field of Classification Search
CPC ........ C03B 9/00; C03B 9/193; C03B 9/1932; C03B 11/06; C03B 11/10
USPC ................ 215/355, 358, 40, 43, 50
See application file for complete search history.

(56) References Cited

U.S. PATENT DOCUMENTS

| | | | |
|---|---|---|---|
| 2,024,748 A | 12/1935 | Schaffer et al. | |
| 3,846,103 A | 11/1974 | Rowe | |
| 4,442,082 A * | 4/1984 | Sanjurjo | 423/350 |
| 4,446,120 A * | 5/1984 | Schmidt et al. | 423/350 |
| 4,529,576 A * | 7/1985 | Sancier | 423/350 |
| 4,584,181 A * | 4/1986 | Nanis et al. | 422/241 |
| 4,586,944 A | 5/1986 | Romberg | |
| 4,748,014 A * | 5/1988 | Nanis et al. | 423/350 |
| 4,777,030 A * | 10/1988 | Sancier | 423/348 |
| 5,120,341 A | 6/1992 | Nozawa et al. | |
| 5,411,564 A | 5/1995 | Bolin | |
| 6,079,226 A | 6/2000 | Leidy | |
| 6,286,339 B1 | 9/2001 | DiFrank | |

FOREIGN PATENT DOCUMENTS

| | | |
|---|---|---|
| JP | S56 125223 A | 10/1981 |
| WO | 2012120673 A1 | 9/2012 |

OTHER PUBLICATIONS

PCT International Search Report and Written Opinion, Serial No. PCT/US2013/040852N Filed: May 14, 2013 Date of Mailing: Aug. 29, 2013.

* cited by examiner

*Primary Examiner* — Jason L Lazorcik

(57) ABSTRACT

A parison mold assembly for a press-and-blow glassware forming machine includes a neck ring for molding a finish portion of a parison, a parison mold for molding a body portion of the parison, and a plunger for insertion through the neck ring into the parison mold for pressing a hot glass gob against inner surfaces of the neck ring and the parison mold. The plunger has an outer surface of revolution around a central axis, including a first portion disposed within the neck ring when the plunger is fully inserted through the neck ring into the parison mold, a second portion spaced from the first portion, and a transition third portion extending between the first and second portions.

16 Claims, 3 Drawing Sheets

PLUNGER AND PARISON MOLD ASSEMBLY FOR A NARROW-NECK PRESS-AND-BLOW WINE BOTTLE

The present disclosure relates to a parison mold assembly, including a plunger, for manufacture of a narrow-neck press-and-blow wine bottle having a cork-type finish.

BACKGROUND AND SUMMARY OF THE DISCLOSURE

Blow-and-blow glassware manufacturing processes typically are employed for manufacture of wine bottles having a cork-type finish to obtain an inside surface in the finish area from which a cork can be readily removed employing a so-called Ah-So cork puller. Use of press-and-blow glassware manufacturing processes is desirable to reduce bottle wall thickness and thus the amount of glass employed in each bottle. A general object of the present disclosure is to provide a parison mold assembly, including particularly a parison pressing plunger, for forming a wine bottle parison having a cork finish and a smooth inside surface in the corkage area that will readily permit use of Ah-So and other types of cork removal devices.

The present disclosure embodies a number of aspects that can be implemented separately from or in combination with each other.

A parison pressing plunger for a press-and-blow glassware manufacturing machine, in accordance with one aspect of the present disclosure, includes a body having an outer surface of revolution around a central axis. The outer surface of revolution includes at least first and second spaced portions and an intermediate third portion extending between the first and second spaced portions. The first and second spaced surface portions are conical at angles of not more than 2.0° to the central axis and the third portion is conical at an angle of at least (i.e., not less than) 4° to the central axis. The third surface portion preferably has an angle between 4° and 6° inclusive to the axis, most preferably an angle of 4.74° to the axis.

A parison mold assembly for a press-and-blow glassware forming machine, in accordance with another aspect of the present disclosure, includes a neck ring for molding a finish portion of a parison, a parison mold for molding a body portion of the parison, and a plunger for insertion through the neck ring into the parison mold for pressing a hot glass gob against inner surfaces of the neck ring and the parison mold. The plunger has an outer surface of revolution around a central axis, including a first portion disposed within the neck ring when the plunger is fully inserted through the neck ring into the parison mold, a second portion spaced from the first portion, and a transition third portion extending between the first and second portions. The transition third portion of said outer surface is at an angle of at least 4° to the central axis of the plunger. The first, second and third portions preferably are all conical at differing angles with respect to the axis of the plunger. The third portion preferably has an angle of 4.74° to the axis of the plunger, while the first and second portions preferably have angles of not more than 1° to such axis.

A parison mold assembly for forming a wine bottle parison having a cork finish with a corkage control depth, in accordance with a further aspect of the present disclosure, includes a neck ring, a parison mold and a parison pressing plunger. The plunger includes a body having a reference end surface, a central axis perpendicular to such reference end surface, and an outer surface of revolution around such axis and extending from the reference surface. The outer surface of revolution includes a control surface extending from the reference surface, with a conical first portion adjacent to the reference surface, a conical second portion spaced from the reference surface, and a conical third portion extending between and contiguous with the first and second portions. The third surface portion has an angle to the axis that is greater than those of the first and second surface portions. The corkage control depth, measured from the reference surface, terminates in the second surface portion of the plunger body. The third surface portion preferably has an angle of at least 4° to the central axis of the plunger body, most preferably an angle of 4.74° to such axis. The first and second surface portions preferably have angles of not more than 2.0° to the central axis of the plunger body.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
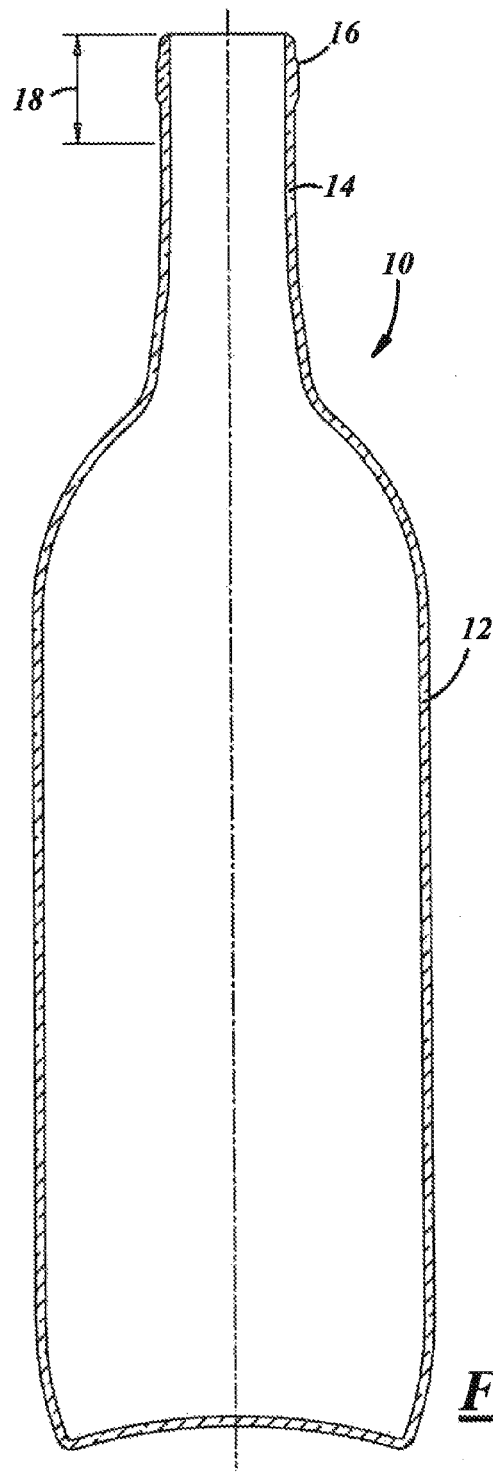
FIG. 1 is a sectional view in side elevation of a wine bottle having a cork-type finish manufactured in accordance with the present disclosure.

FIG. 1 is a sectional view of a wine bottle 10 having a body 12, a neck 14 and a cork-type finish 16. Wine bottle 10 preferably is manufactured in a press-and-blow glassware manufacturing machine, in which a hot gob of molten glass is fed to a parison mold (FIG. 2) and formed into a parison by insertion of a plunger through a neck ring into the parison mold. The plunger presses the molten glass against the surfaces of the neck ring and the parison mold such that the finish is formed to final geometry within the neck ring while a parison body is formed to temporary geometry within the parison mold. The parison is then transferred to a blow mold, typically using the neck ring as a transfer element, in which the body of the bottle is formed to final geometry by blowing of the parison body against internal surfaces of the blow mold. Measuring from the end surface of the bottle finish, the inside surfaces of the bottle finish and neck have a controlled geometry at least over a corkage control depth 18.

Figure 2:
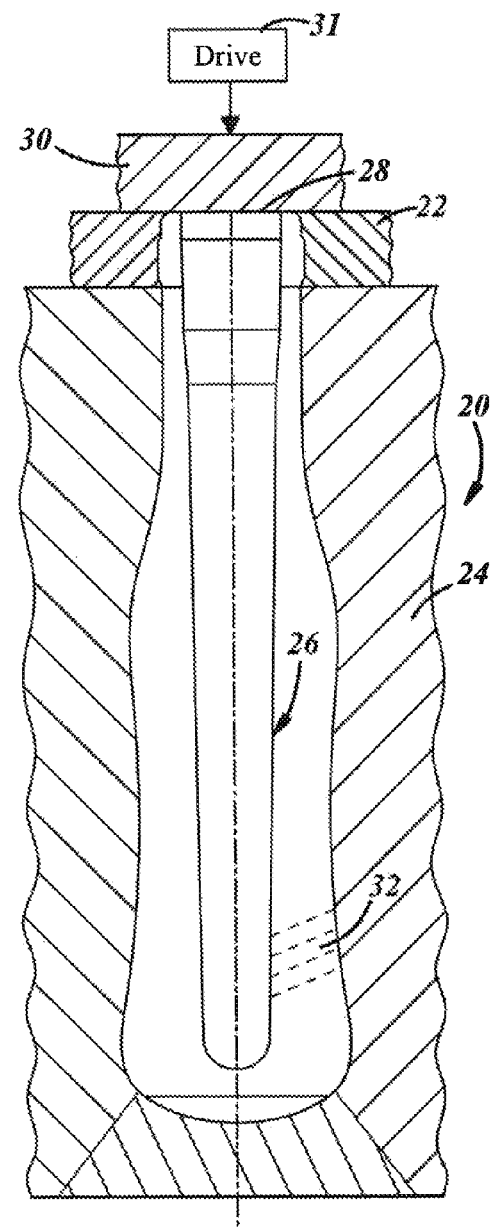
FIG. 2 is a fragmentary sectional view of a parison mold assembly including a parison pressing plunger in accordance with an exemplary embodiment of the present disclosure.

FIG. 2 illustrates a parison mold assembly 20 as including a neck ring 22 and a parison mold 24. A plunger 26 has a reference end surface 28 mounted on a support 30 coupled to a suitable drive 31 for insertion through neck ring 22 into parison mold 24 to press a gob 32 of molten glass against the inside surfaces of neck ring 22 and mold 24. After removal of plunger 26, mold 24 is opened and the parison is transferred to a blow station, typically employing neck ring 22 as a transfer element. (The parison mold assembly is illustrated in FIG. 2 in an inverted orientation as compared to what is typical in the art.) Plunger 26 can be solid or, more typically, hollow with internal cooling means. U.S. Pat. Nos. 6,079,226 and 6,286,339 illustrate exemplary plunger drive and cooling arrangements.

Figure 3:
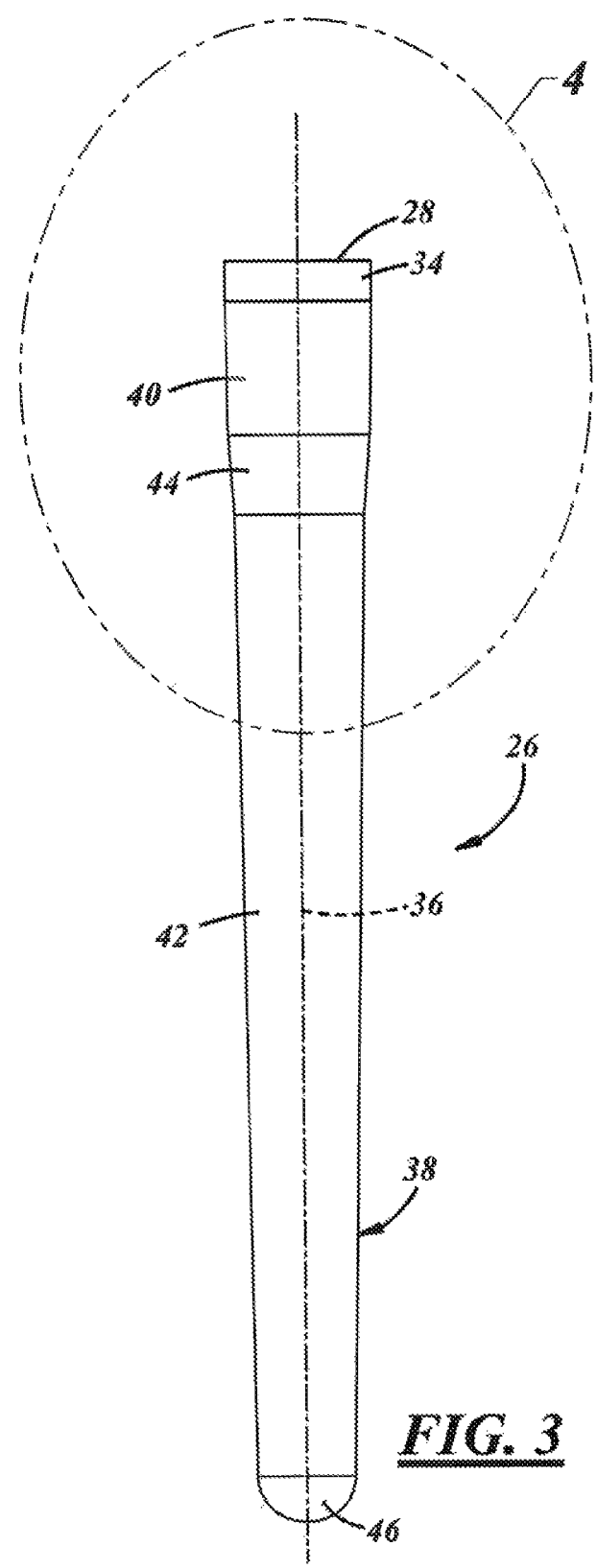
FIG. 3 is a side elevational view of the plunger in FIG. 2.
Figure 4:
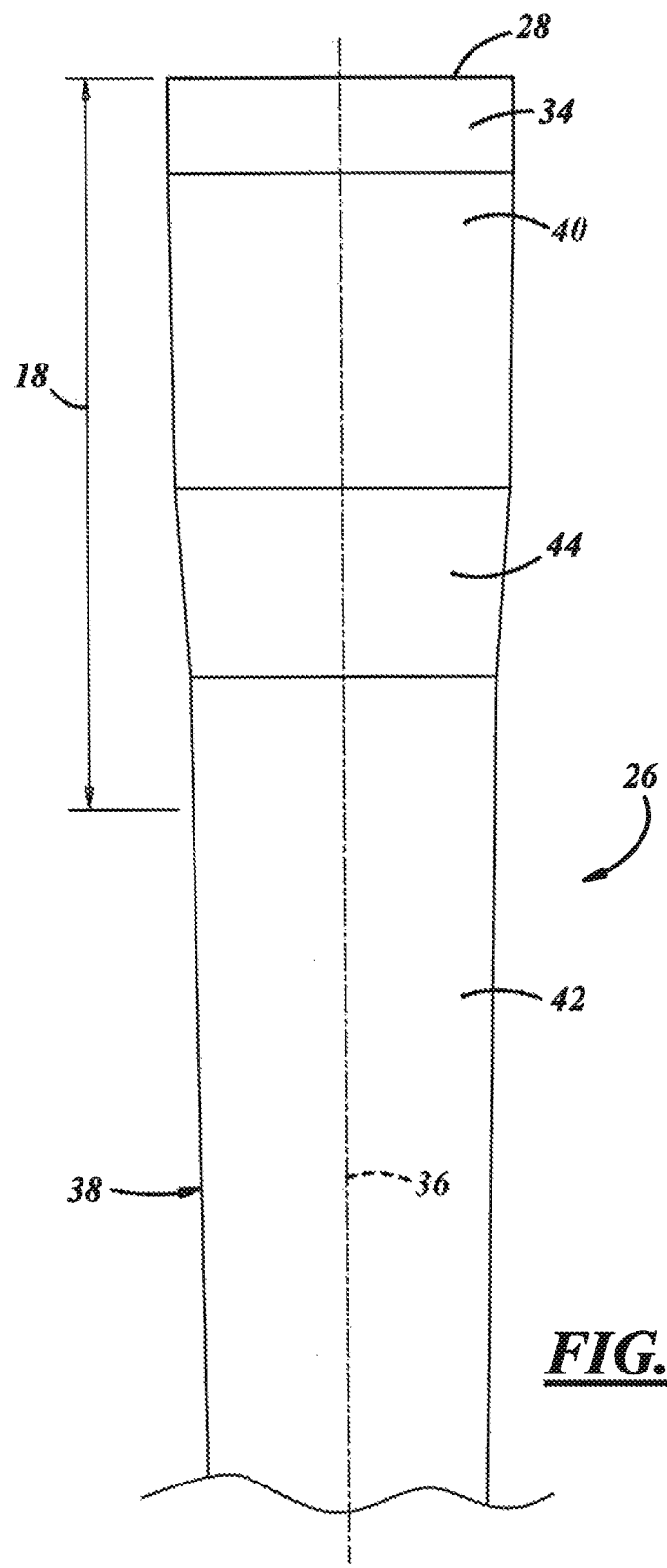
FIG. 4 is a side elevational view on an enlarged scale of the portion of FIG. 3 within the area 4.

Plunger 26 is illustrated in greater detail in FIGS. 3 and 4, including a base 34 having reference surface 28, which typically is flat and perpendicular to the central axis 36 of the plunger body 38. Plunger body 38 (which can be solid or hollow as previously noted) has an outer surface of revolution around axis 36, with a first surface portion 40 adjacent to reference surface 28 of base 34, a second surface portion 42 spaced from first surface portion 40, and an intermediate third surface portion 44 extending between and contiguous with surface portions 40 and 42. The plunger body also typically has a rounded nose 46, typically having a spherical or near-spherical outer surface. Corkage control depth 18 (FIGS. 1 and 4) extends from reference surface 28 and terminates in second surface portion 42, and may have a length of 1.5 inches from reference surface 28 for example. Surface portions 40 and 42 preferably are conical and have surfaces at angles of not more than 2.0° to axis 36. In the exemplary embodiment of FIGS. 3 and 4, surface portion 40 has an angle of 0.97° with respect to axis 36, and surface portion 42 has an angle of 0.92° with respect to axis 36. Intermediate or third surface portion 44 has an angle of at least (i.e., not less than) 4° with respect to axis 36, preferably between 4° and 6° inclusive with respect to axis 36, and most preferably an angle of 4.74° with respect to axis 36.

It has been found that provision of three conical surface portions 40, 42, 44, preferably at differing angles to the axis of the plunger body, particularly with the intermediate third portion 44 being at a greater angle to the plunger body axis than the spaced first and second portions 40, 42, produces a smooth inside surface at the bottle finish 16 and neck 14 at least over the corkage control depth 18. The thickness of the glass in the finish 16 can be reduced so that the finish cools more quickly and does not tend to re-heat and flow during the final blow stage of the bottle. In this respect, it has been found that the described taper angles on the plunger effectively replicate the corkage internal profile obtained in a blow-and-blow bottle manufacturing operation while permitting the reduced glass thickness that can be obtained in a press-and-blow process.

There thus has been disclosed a parison mold assembly, including a parison pressing plunger, that fully satisfy all of the objects and aims previously set forth. The disclosure has been presented in conjunction with an exemplary embodiment, and modifications and variations have been discussed. Other modifications and variations readily will suggest themselves to persons of ordinary skill in the art in view of the foregoing description. The disclosure is intended to embrace all such modifications and variations as fall within the spirit and broad scope of the appended claims.

The invention claimed is:

1. A parison pressing plunger for a press-and-blow glassware manufacturing machine, which includes:
   a base, a nose, and a body extending between the base and the nose, said body having a central axis and an outer surface of revolution around said central axis,
   said outer surface of revolution including at least first and second spaced portions and an intermediate third portion extending between said first and second spaced portions,
   said first and second spaced portions being conical and tapering in the direction from the base toward the nose at angles of not more than 2.0° to said axis and said third portion is a conical outer surface and tapering in the direction from the base to the nose at an angle between 4° and 6° inclusive to said axis.

2. The plunger set forth in claim 1 wherein said third portion is at an angle of 4.74° to said axis.

3. The plunger set forth in claim 1 wherein said first portion has an angle of 0.97°, said second portion has an angle of 0.92°, and said third portion has an angle of 4.74°.

4. A parison mold assembly for a press-and-blow glassware forming machine, which includes:
   a neck ring for molding a finish portion of a parison,
   a parison mold for molding a body portion of the parison, and
   a plunger for insertion through said neck ring into said parison mold for pressing a hot glass gob against an inner surface of said neck ring and said parison mold,
   said plunger having:
   a base, a nose, and an outer surface of revolution around a central axis and including a first portion disposed within said neck ring when said plunger is fully inserted through the neck ring into the parison mold, a second portion spaced from said first portion, and a transition third portion extending between said first and second portions,
   said first and second portions being conical outer surfaces and tapering in the direction from the base toward the nose at angles of not more than 2.0° to said axis,
   said transition third portion being a conical outer surface tapering in the direction from the base toward the nose at an angle between 4° and 6° inclusive to said axis.

5. The parison mold assembly set forth in claim 4 wherein said first, second and third portions are conical at differing angles with respect to said axis.

6. The parison mold assembly set forth in claim 5 wherein said third portion has an angle of 4.74° to said axis.

7. The parison mold assembly set forth in claim 4 wherein said first portion has an angle of 0.97°, said second portion has an angle of 0.92°, and said third portion has an angle of 4.74°.

8. A parison mold assembly for forming a wine bottle parison having a cork finish with a corkage control depth, which includes:
   a neck ring having an inside surface for molding a cork-type parison finish,
   a parison mold having an inside surface for molding a parison body, and
   a plunger for insertion through said neck ring into said parison mold to press a hot glass gob against inside surfaces of said neck ring and said parison mold, said plunger including:
   a base having a reference surface, a central axis perpendicular to said reference surface, a nose, and an outer surface of revolution around said axis and extending from said reference surface to the nose,
   said outer surface of revolution including a control surface extending from said reference surface, including at least a conical first surface portion adjacent to said reference surface, a conical second surface portion spaced from said first surface portion, and a conical third surface portion extending between and contiguous with said first and second surface portions,
   said first and second surface portions tapering in the direction from the base toward the nose at angles of not more than 2.0° to said axis,
   said third surface portion tapering in the direction from the base toward the nose at an angle between 4° and 6° inclusive to said axis,
   said control depth, measured from said reference surface, terminating in said second surface portion.

9. The parison mold assembly set forth in claim 8 wherein said third surface portion has an angle of 4.74° to said axis.

10. The parison mold assembly set forth in claim 8 wherein said first surface portion has an angle of 0.97°, said second surface portion has an angle of 0.92°, and said third surface portion has an angle of 4.74°.

11. A parison pressing plunger for a press-and-blow glassware manufacturing machine, which includes:
   a reference surface;
   a nose;
   a central axis extending through said reference surface and said nose; and
   an outer surface of revolution around said central axis, and including:
   a first portion adjacent to the reference surface and tapering in a direction from said reference surface toward said nose at a first non-zero angle of not more than 2.0° measured with respect to the central axis,
   a second portion adjacent to the nose, spaced axially from said first portion, and tapering in the direction from said reference surface toward said nose at a second non-zero angle of not more than 2.0° measured with respect to the central axis and less than said first non-zero angle,
   a third portion axially between said first and second portions and tapering in the direction from said reference surface toward said nose at an angle not less than 4°.

12. The plunger set forth in claim 11 wherein said third portion has an angle between 4° and 6° inclusive to said axis.

13. The plunger set forth in claim 12 wherein said first portion has an angle of 0.97°, said second portion has an angle of 0.92°, and said third portion has an angle of 4.74°.

14. A parison mold assembly for a press-and-blow glassware forming machine, which includes:
   a neck ring for molding a finish portion of a parison;
   a parison mold for molding a body portion of said parison; and
   the plunger set forth in claim 11, for insertion through said neck ring into said parison mold for pressing a hot glass gob against an inner surface of said neck ring and said parison mold, wherein a control depth extends from said reference surface and terminates in said second surface portion.

15. The parison mold assembly set forth in claim 14 wherein said third surface is spaced apart from said neck ring along the direction of the central axis and is located within said parison mold.

16. The parison mold assembly set forth in claim 15 wherein said first surface spans said neck ring and said parison mold along a direction of the central axis.

\* \* \* \* \*